United States Patent
Feuerlein et al.

(10) Patent No.: US 11,080,853 B2
(45) Date of Patent: Aug. 3, 2021

(54) CALCULATING AN IMAGE MATRIX SIZE

(71) Applicant: Siemens Healthcare GmbH, Erlangen (DE)

(72) Inventors: Ute Feuerlein, Erlangen (DE); Martin Petersilka, Adelsdorf (DE); Rainer Raupach, Heroldsbach (DE); Johan Sunnegaardh, Erlangen (DE)

(73) Assignee: SIEMENS HEALTHCARE GMBH, Erlangen (DE)

( * ) Notice: Subject to any disclaimer, the term of this patent is extended or adjusted under 35 U.S.C. 154(b) by 26 days.

(21) Appl. No.: 16/775,362

(22) Filed: Jan. 29, 2020

(65) Prior Publication Data
US 2020/0258221 A1 Aug. 13, 2020

(30) Foreign Application Priority Data

Feb. 8, 2019 (EP) .................................... 19156188
Feb. 26, 2019 (EP) .................................... 19159454

(51) Int. Cl.
*G06T 7/00* (2017.01)
*G06T 11/00* (2006.01)

(52) U.S. Cl.
CPC .......... *G06T 7/0012* (2013.01); *G06T 11/006* (2013.01); *G06T 2207/10081* (2013.01); *G06T 2210/41* (2013.01); *G06T 2211/424* (2013.01)

(58) Field of Classification Search
CPC ................ G06T 7/0012; G06T 11/006; G06T 2207/10081; G06T 2210/41; G06T 2211/424
See application file for complete search history.

(56) References Cited

U.S. PATENT DOCUMENTS

2004/0120451 A1* 6/2004 Tsukagoshi ............ A61B 6/032
378/4

OTHER PUBLICATIONS

Burstein, Paul et al. "A Guide to Computed Tomography System Specifications" Wright Research & Development Center; Aug. 1990. (Year: 1990).*

(Continued)

*Primary Examiner* — Vu Le
*Assistant Examiner* — Julius Chai
(74) *Attorney, Agent, or Firm* — Harness, Dickey & Pierce, P.L.C.

(57) ABSTRACT

An embodiment of the invention relates to a method for calculating an image matrix size N for reconstructing image data of an examination subject from projection data. The method includes acquiring projection data obtained during a relative rotational movement between a radiation source of a computed tomography system and the examination subject; calculating the image matrix size N as a function of an extent of an axial field of view of the computed tomography system and a sharpness value in the image data to be reconstructed; and making the calculated image matrix size available to a reconstruction unit to reconstruct the image data from the projection data acquired.

16 Claims, 3 Drawing Sheets

(56) References Cited

OTHER PUBLICATIONS

Hata, Akinori et al. "Effect of Matrix Size an the Image Quality of Ultra-high-resolution CT of the Lung" Academic Radiology; vol. 25; No. 7; pp. 869-876; 2018 // ISSN: 1076-6332; DOI:10.1016/j.acra.2017.11.017.
Burstein, Paul et al. "A Guide to Computed Tomography System Specifications" Wright Research & Development Center; Aug. 1990 (Aug. 1990) // https://apps.dtic.mil/dtic/tr/fulltext/u2/a229998.pdf.
Extended European search Report for European Application No. 19159454.8 dated Sep. 9, 20119.

\* cited by examiner

CALCULATING AN IMAGE MATRIX SIZE

PRIORITY STATEMENT

The present application hereby claims priority under 35 U.S.C. § 119 to European patent application numbers EP 19156188.5 filed Feb. 8, 2019 and EP 19159454.8 filed Feb. 26, 2019, the entire contents of each of which are hereby incorporated herein by reference.

FIELD

At least one embodiment of the invention generally relate to a device/method for calculating the size of an image matrix for the purpose of reconstructing medical image data. At least one embodiment of the invention generally relates to medical image data in the form of clinical images acquired using computed tomography.

BACKGROUND

A computed tomography system known per se comprises a measurement system encompassing a (maximally) high number of available detector channels and a maximally small tube focus. The computed tomography system could be used much more efficiently if a larger image matrix were used for the reconstruction of the medical image from the X-ray projection data acquired via the detector channels, said increase in image matrix size leading to a higher spatial resolution. The image quality could be improved as a result. In scans of the thorax, this could reduce or even avoid e.g. streak artifacts at sharp edges with high contrast. However, not just the image quality increases with the size of the image matrix, but also the required reconstruction time, as well as the required storage volume. In this respect, it is important in every examination to achieve a balance between a matrix size that is optimal for the examination type and the other cited parameters.

It is known to use a matrix in the size 512×512, typically specified in advance. This means that a two-dimensional (slice) image acquisition is generated from the projection data, which image has 512 picture elements, i.e. pixels, in two spatial dimensions in each case. In other cases, the operator can manually select a matrix of 256×256, e.g. for cardio-multiphase reconstructions. In acquisitions of this type, an extremely high number of images is generated, said images being used primarily in order to visualize changes over time. Spatial gradients are therefore less relevant than temporal gradients in this type of examination. The accompanying reduction in spatial resolution is therefore acceptable for this type of examination. If the typical matrix size of 512×512 were to be retained in this case, the storage volume required in an image archive (e.g. a PACS) would be disproportionately high.

SUMMARY

At least one embodiment of the present invention provides an alternative device/method to enable the optimal matrix size for the type of examination to be determined and set automatically without the requirement for an operator input and corresponding background knowledge on the part of the operator.

Embodiments are directed to a method for calculating an image matrix size, a corresponding computing unit, a corresponding computed tomography system, a computer program, and a corresponding computer-readable medium according to the independent claims. Preferred and/or alternative advantageous embodiment variants are the subject matter of the claims.

An inventive achievement of the embodiments are described below both in relation to the claimed method and in relation to the claimed devices. Features, advantages or alternative embodiment variants mentioned herein are equally to be applied to the other claimed objects, and vice versa. In other words, object-related claims (which are directed for example to a method) can also be developed by way of features that are described or claimed in connection with one of the devices. The corresponding functional features of the method are in this case embodied via corresponding object-related modules or units.

The present invention relates in a first embodiment to a method for calculating an image matrix size for the purpose of reconstructing image data of an examination subject from projection data. The projection data was acquired during a relative rotational movement between a radiation source of a computed tomography system and the examination subject. The calculated image matrix size is made available to a reconstruction unit in order to allow the reconstruction of the image data from the projection data.

In another embodiment, the invention relates to a computing unit for calculating an image matrix size for the purpose of reconstructing image data of an examination subject from projection data, wherein the computing unit is embodied for acquiring projection data recorded during a relative rotational movement between a radiation source of a computed tomography system and the examination subject, and calculating the image matrix size in accordance with the steps of the method according to an embodiment of the invention.

In another embodiment, the invention relates to a computed tomography system for calculating an image matrix size for the purpose of reconstructing image data of an examination subject from projection data, comprising a computing unit according to an embodiment of the invention, and a reconstruction unit for reconstructing image data having the calculated image matrix size from the projection data.

In another embodiment, the invention relates to a computer program which can be loaded directly into a memory unit of a computing unit according to an embodiment of the invention and has program sections for performing the steps of the method according to an embodiment of the invention when the computer program is executed in the computing unit.

In another embodiment, the invention relates to a computer-readable medium on which program sections that can be read in and executed by a computing unit according to an embodiment of the invention in order to perform all steps of the method according to an embodiment of the invention when the program sections are executed by the computing unit.

In another embodiment, the invention relates to a method for calculating an image matrix size N for reconstructing image data of an examination subject from projection data, the method comprising:

acquiring projection data obtained during a relative rotational movement between a radiation source of a computed tomography system and the examination subject;

calculating the image matrix size N as a function of an extent of an axial field of view of the computed tomography system and a sharpness value in the image data to be reconstructed; and making the calculated image matrix size available to a reconstruction unit to reconstruct the image data from the projection data acquired.

In another embodiment, the invention relates to a computing unit (such as or including at least one processor for example) to calculate an image matrix size N for reconstructing image data of an examination subject from projection data, wherein the computing unit is embodied to acquire projection data recorded during a relative rotational movement between a radiation source of a computed tomography system and the examination subject; and calculate the image matrix size N as a function of an extent of an axial field of view of the computed tomography system and a sharpness value in the image data to be reconstructed.

In another embodiment, the invention relates to a computed tomography system for calculating an image matrix size N for reconstructing image data of an examination subject from projection data, comprising:

a computing unit (such as or including at least one processor for example) embodied to acquire projection data recorded during a relative rotational movement between a radiation source of a computed tomography system and the examination subject, and calculate the image matrix size N as a function of an extent of an axial field of view of the computed tomography system and a sharpness value in the image data to be reconstructed; and a reconstruction unit, embodied to reconstruct image data having the calculated image matrix size N from the projection data.

In another embodiment, the invention relates to a non-transitory computer program, directly loadable into a memory of a computing unit and including program sections for performing the method of an embodiment when the computer program is executed in the computing unit.

In another embodiment, the invention relates to a non-transitory computer-readable medium, storing program sections readable into and executable by a computing unit, to perform the method of an embodiment when the program sections are executed by the computing unit.

BRIEF DESCRIPTION OF THE DRAWINGS

The above-described characteristics, features and advantages of this invention, as well as the manner in which these are realized, will become clearer and more readily understandable in connection with the following description of the example embodiments, which are explained in more detail with reference to the drawings. This description implies no limitation of the invention to these example embodiments. Like components are labeled with identical reference signs in different figures. The figures are generally not to scale. In the figures.

DETAILED DESCRIPTION OF THE EXAMPLE EMBODIMENTS

Figure 1:
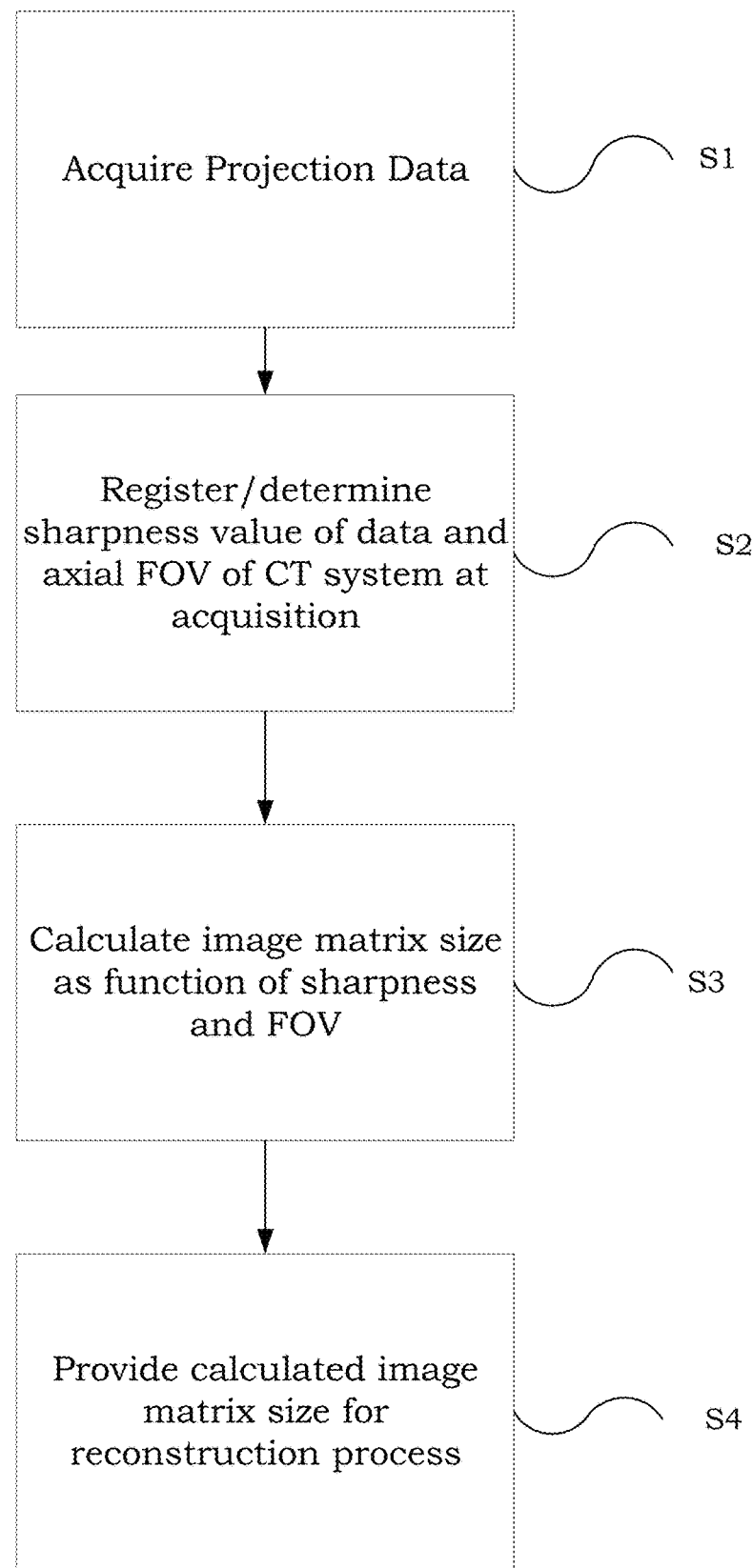
FIG. 1 shows a schematic representation of the inventive method according to an example embodiment of the present invention.

The drawings are to be regarded as being schematic representations and elements illustrated in the drawings are not necessarily shown to scale. Rather, the various elements are represented such that their function and general purpose become apparent to a person skilled in the art. Any connection or coupling between functional blocks, devices, components, or other physical or functional units shown in the drawings or described herein may also be implemented by an indirect connection or coupling. A coupling between components may also be established over a wireless connection. Functional blocks may be implemented in hardware, firmware, software, or a combination thereof.

Various example embodiments will now be described more fully with reference to the accompanying drawings in which only some example embodiments are shown. Specific structural and functional details disclosed herein are merely representative for purposes of describing example embodiments. Example embodiments, however, may be embodied in various different forms, and should not be construed as being limited to only the illustrated embodiments. Rather, the illustrated embodiments are provided as examples so that this disclosure will be thorough and complete, and will fully convey the concepts of this disclosure to those skilled in the art. Accordingly, known processes, elements, and techniques, may not be described with respect to some example embodiments. Unless otherwise noted, like reference characters denote like elements throughout the attached drawings and written description, and thus descriptions will not be repeated. The present invention, however, may be embodied in many alternate forms and should not be construed as limited to only the example embodiments set forth herein.

It will be understood that, although the terms first, second, etc. may be used herein to describe various elements, components, regions, layers, and/or sections, these elements, components, regions, layers, and/or sections, should not be limited by these terms. These terms are only used to distinguish one element from another. For example, a first element could be termed a second element, and, similarly, a second element could be termed a first element, without departing from the scope of example embodiments of the present invention. As used herein, the term "and/or," includes any and all combinations of one or more of the associated listed items. The phrase "at least one of" has the same meaning as "and/or".

Spatially relative terms, such as "beneath," "below," "lower," "under," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below," "beneath," or "under," other elements or features would then be oriented "above" the other elements or features. Thus, the example terms "below" and "under" may encompass both an orientation of above and below. The device may be otherwise oriented (rotated 90 degrees or at other orientations) and the spatially relative descriptors used herein interpreted accordingly. In addition, when an element is referred to as being "between" two elements, the element may be the only element between the two elements, or one or more other intervening elements may be present.

Spatial and functional relationships between elements (for example, between modules) are described using various terms, including "connected," "engaged," "interfaced," and "coupled." Unless explicitly described as being "direct," when a relationship between first and second elements is described in the above disclosure, that relationship encompasses a direct relationship where no other intervening elements are present between the first and second elements, and also an indirect relationship where one or more intervening elements are present (either spatially or functionally) between the first and second elements. In contrast, when an element is referred to as being "directly" connected, engaged, interfaced, or coupled to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting of example embodiments of the invention. As used herein, the singular forms "a," "an," and "the," are intended to include the plural forms as well, unless the context clearly indicates otherwise. As used herein, the terms "and/or" and "at least one of" include any and all combinations of one or more of the associated listed items. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Also, the term "exemplary" is intended to refer to an example or illustration.

When an element is referred to as being "on," "connected to," "coupled to," or "adjacent to," another element, the element may be directly on, connected to, coupled to, or adjacent to, the other element, or one or more other intervening elements may be present. In contrast, when an element is referred to as being "directly on," "directly connected to," "directly coupled to," or "immediately adjacent to," another element there are no intervening elements present.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Before discussing example embodiments in more detail, it is noted that some example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Specific structural and functional details disclosed herein are merely representative for purposes of describing example embodiments of the present invention. This invention may, however, be embodied in many alternate forms and should not be construed as limited to only the embodiments set forth herein.

Units and/or devices according to one or more example embodiments may be implemented using hardware, software, and/or a combination thereof. For example, hardware devices may be implemented using processing circuity such as, but not limited to, a processor, Central Processing Unit (CPU), a controller, an arithmetic logic unit (ALU), a digital signal processor, a microcomputer, a field programmable gate array (FPGA), a System-on-Chip (SoC), a programmable logic unit, a microprocessor, or any other device capable of responding to and executing instructions in a defined manner. Portions of the example embodiments and corresponding detailed description may be presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device/hardware, that manipulates and transforms data represented as physical, electronic quantities within the computer system's registers and memories into other data similarly represented as physical quantities within the computer system memories or registers or other such information storage, transmission or display devices.

In this application, including the definitions below, the term 'module' or the term 'controller' may be replaced with the term 'circuit.' The term 'module' may refer to, be part of, or include processor hardware (shared, dedicated, or group) that executes code and memory hardware (shared, dedicated, or group) that stores code executed by the processor hardware.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

Software may include a computer program, program code, instructions, or some combination thereof, for independently or collectively instructing or configuring a hardware device to operate as desired. The computer program and/or program code may include program or computer-readable instructions, software components, software modules, data files, data structures, and/or the like, capable of being implemented by one or more hardware devices, such as one or more of the hardware devices mentioned above. Examples of program code include both machine code produced by a compiler and higher level program code that is executed using an interpreter.

For example, when a hardware device is a computer processing device (e.g., a processor, Central Processing Unit (CPU), a controller, an arithmetic logic unit (ALU), a digital signal processor, a microcomputer, a microprocessor, etc.), the computer processing device may be configured to carry out program code by performing arithmetical, logical, and input/output operations, according to the program code. Once the program code is loaded into a computer processing device, the computer processing device may be programmed to perform the program code, thereby transforming the computer processing device into a special purpose computer processing device. In a more specific example, when the program code is loaded into a processor, the processor becomes programmed to perform the program code and operations corresponding thereto, thereby transforming the processor into a special purpose processor.

Software and/or data may be embodied permanently or temporarily in any type of machine, component, physical or virtual equipment, or computer storage medium or device, capable of providing instructions or data to, or being interpreted by, a hardware device. The software also may be distributed over network coupled computer systems so that the software is stored and executed in a distributed fashion. In particular, for example, software and data may be stored by one or more computer readable recording mediums, including the tangible or non-transitory computer-readable storage media discussed herein.

Even further, any of the disclosed methods may be embodied in the form of a program or software. The program or software may be stored on a non-transitory computer readable medium and is adapted to perform any one of the aforementioned methods when run on a computer device (a device including a processor). Thus, the non-transitory, tangible computer readable medium, is adapted to store information and is adapted to interact with a data processing facility or computer device to execute the program of any of the above mentioned embodiments and/or to perform the method of any of the above mentioned embodiments.

Example embodiments may be described with reference to acts and symbolic representations of operations (e.g., in the form of flow charts, flow diagrams, data flow diagrams, structure diagrams, block diagrams, etc.) that may be implemented in conjunction with units and/or devices discussed in more detail below. Although discussed in a particularly manner, a function or operation specified in a specific block may be performed differently from the flow specified in a flowchart, flow diagram, etc. For example, functions or operations illustrated as being performed serially in two consecutive blocks may actually be performed simultaneously, or in some cases be performed in reverse order.

According to one or more example embodiments, computer processing devices may be described as including various functional units that perform various operations and/or functions to increase the clarity of the description. However, computer processing devices are not intended to be limited to these functional units. For example, in one or more example embodiments, the various operations and/or functions of the functional units may be performed by other ones of the functional units. Further, the computer processing devices may perform the operations and/or functions of the various functional units without sub-dividing the operations and/or functions of the computer processing units into these various functional units.

Units and/or devices according to one or more example embodiments may also include one or more storage devices. The one or more storage devices may be tangible or non-transitory computer-readable storage media, such as random access memory (RAM), read only memory (ROM), a permanent mass storage device (such as a disk drive), solid state (e.g., NAND flash) device, and/or any other like data storage mechanism capable of storing and recording data. The one or more storage devices may be configured to store computer programs, program code, instructions, or some combination thereof, for one or more operating systems and/or for implementing the example embodiments described herein. The computer programs, program code, instructions, or some combination thereof, may also be loaded from a separate computer readable storage medium into the one or more storage devices and/or one or more computer processing devices using a drive mechanism. Such separate computer readable storage medium may include a Universal Serial Bus (USB) flash drive, a memory stick, a Blu-ray/DVD/CD-ROM drive, a memory card, and/or other like computer readable storage media. The computer programs, program code, instructions, or some combination thereof, may be loaded into the one or more storage devices and/or the one or more computer processing devices from a remote data storage device via a network interface, rather than via a local computer readable storage medium. Additionally, the computer programs, program code, instructions, or some combination thereof, may be loaded into the one or more storage devices and/or the one or more processors from a remote computing system that is configured to transfer and/or distribute the computer programs, program code, instructions, or some combination thereof, over a network. The remote computing system may transfer and/or distribute the computer programs, program code, instructions, or some combination thereof, via a wired interface, an air interface, and/or any other like medium.

The one or more hardware devices, the one or more storage devices, and/or the computer programs, program code, instructions, or some combination thereof, may be specially designed and constructed for the purposes of the example embodiments, or they may be known devices that are altered and/or modified for the purposes of example embodiments.

A hardware device, such as a computer processing device, may run an operating system (OS) and one or more software applications that run on the OS. The computer processing device also may access, store, manipulate, process, and create data in response to execution of the software. For simplicity, one or more example embodiments may be exemplified as a computer processing device or processor; however, one skilled in the art will appreciate that a hardware device may include multiple processing elements or processors and multiple types of processing elements or processors. For example, a hardware device may include multiple processors or a processor and a controller. In addition, other processing configurations are possible, such as parallel processors.

The computer programs include processor-executable instructions that are stored on at least one non-transitory computer-readable medium (memory). The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc. As such, the one or more processors may be configured to execute the processor executable instructions.

The computer programs may include: (i) descriptive text to be parsed, such as HTML (hypertext markup language) or XML (extensible markup language), (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C#, Objective-C, Haskell, Go, SQL, R, Lisp, Java®, Fortran, Perl, Pascal, Curl, OCaml, Javascript®, HTML5, Ada, ASP (active server pages), PHP, Scala, Eiffel, Smalltalk, Erlang, Ruby, Flash®, Visual Basic®, Lua, and Python®.

Further, at least one embodiment of the invention relates to the non-transitory computer-readable storage medium including electronically readable control information (processor executable instructions) stored thereon, configured in such that when the storage medium is used in a controller of a device, at least one embodiment of the method may be carried out.

The computer readable medium or storage medium may be a built-in medium installed inside a computer device main body or a removable medium arranged so that it can be separated from the computer device main body. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The term code, as used above, may include software, firmware, and/or microcode, and may refer to programs, routines, functions, classes, data structures, and/or objects. Shared processor hardware encompasses a single microprocessor that executes some or all code from multiple modules. Group processor hardware encompasses a microprocessor that, in combination with additional microprocessors, executes some or all code from one or more modules. References to multiple microprocessors encompass multiple microprocessors on discrete dies, multiple microprocessors on a single die, multiple cores of a single microprocessor, multiple threads of a single microprocessor, or a combination of the above.

Shared memory hardware encompasses a single memory device that stores some or all code from multiple modules. Group memory hardware encompasses a memory device that, in combination with other memory devices, stores some or all code from one or more modules.

The term memory hardware is a subset of the term computer-readable medium. The term computer-readable medium, as used herein, does not encompass transitory electrical or electromagnetic signals propagating through a medium (such as on a carrier wave); the term computer-readable medium is therefore considered tangible and non-transitory. Non-limiting examples of the non-transitory computer-readable medium include, but are not limited to, rewriteable non-volatile memory devices (including, for example flash memory devices, erasable programmable read-only memory devices, or a mask read-only memory devices); volatile memory devices (including, for example static random access memory devices or a dynamic random access memory devices); magnetic storage media (including, for example an analog or digital magnetic tape or a hard disk drive); and optical storage media (including, for example a CD, a DVD, or a Blu-ray Disc). Examples of the media with a built-in rewriteable non-volatile memory, include but are not limited to memory cards; and media with a built-in ROM, including but not limited to ROM cassettes; etc. Furthermore, various information regarding stored images, for example, property information, may be stored in any other form, or it may be provided in other ways.

The apparatuses and methods described in this application may be partially or fully implemented by a special purpose computer created by configuring a general purpose computer to execute one or more particular functions embodied in computer programs. The functional blocks and flowchart elements described above serve as software specifications, which can be translated into the computer programs by the routine work of a skilled technician or programmer.

Although described with reference to specific examples and drawings, modifications, additions and substitutions of example embodiments may be variously made according to the description by those of ordinary skill in the art. For example, the described techniques may be performed in an order different with that of the methods described, and/or components such as the described system, architecture, devices, circuit, and the like, may be connected or combined to be different from the above-described methods, or results may be appropriately achieved by other components or equivalents.

The present invention relates in a first embodiment to a method for calculating an image matrix size for the purpose of reconstructing image data of an examination subject from projection data. The projection data was acquired during a relative rotational movement between a radiation source of a computed tomography system and the examination subject. The calculated image matrix size is made available to a reconstruction unit in order to allow the reconstruction of the image data from the projection data.

At least one embodiment of the present invention is based on the knowledge that the image matrix size is calculated as a function of the axial field of view of the computed tomography system and a sharpness value in the image data to be reconstructed. Preferably, the image matrix size is dependent on a product formed from extent of the axial field of view and the sharpness value.

The axial field of view or the extent of the same denotes the spatial coverage of the field of view of the computed tomography system during the projection data acquisition in a direction perpendicular to the axis of rotation of the computed tomography system. The axial field of view may be embodied as invariable or as adjustable by the X-ray source or via at least one diaphragm device. The axial field of view defines the size of the body section or body part or body region of the examination subject which is imaged via the projection data and through which X-ray radiation is passed. The axial field of view may for example cover approximately 40 cm and thus enable the acquisition of projection data over the entire width of a patient. A possible application would be a computed tomography examination of an entire abdomen. In another example, the axial field of view covers e.g. only a few centimeters, for example when only a single organ, in particular the heart, is to be imaged.

The sharpness value in the image data to be reconstructed signifies a desired maximum spatial frequency or spatial resolution, specified in advance, that must be present in the reconstructed image data. The sharpness value corresponds to a spatial frequency at which the modulation transfer function or contrast transfer function attains a specific value. This function describes in general terms the ratio that is dependent on the spatial frequency of the object and is formed from detail contrast of the image of an object and the detail contrast of the object per se. In other words, the modulation transfer function describes a measure for the imaging quality of the imaging system. The higher the value of the modulation transfer function, the better the imaging of the object by the imaging system. In this sense, the sharpness value is to be regarded as a spatial frequency at which the modulation transfer function assumes a specific value, e.g. 10 percent or 0.1. In this respect, instead of a direct specification of the sharpness value, it is also possible to predefine or specify a value of the modulation transfer function in advance. Owing to the dependence of the modulation transfer function on the spatial frequency, the sharpness value can be derived directly.

The sharpness value can be specified in particular using the unit line pairs per millimeter (lp/mm). The sharpness value is determined in particular by the medical issue that underlies the radiological examination and that is to be resolved by way of the reconstructed image data. The sharpness value may also be predefined by the imaged body region and the tissue composition present therein.

According to at least one embodiment of the invention, the calculation is performed automatically and without operator intervention. It can advantageously be provided that the operator can specify individually for each examination or each image data reconstruction whether the image matrix size is to be calculated automatically or optimized with respect to a default setting. It can furthermore advantageously be provided to specify an upper, i.e. maximum, image matrix size in advance as an upper bound, for example when it is known at the outset that only a limited storage capacity is available for the reconstructed image data. For example, an image matrix size of 1024 can be ruled out from the beginning.

The image matrix size produced as a result of the calculation, also referred to in the following simply as matrix size, may be either larger or smaller than the typically used matrix size of 512×512 picture elements, i.e. pixels. This permits a significant improvement in system performance, e.g. in real-time examinations such as bolus tracking or imaging generally subject to the influence of contrast agent, since in this way the duration of the reconstruction of the image data from the projection data can be reduced.

What is to be understood by projection data within the meaning of the invention are X-ray attenuation profiles or X-ray projection measurement data of the examination subject resulting when X-ray radiation passes through the examination subject and is attenuated in its intensity by the anatomical structures of the examination subject, producing changes in its energy spectrum. The projection data typically comprises a plurality of individual projections which are different in terms of their viewing direction or angle through the examination subject. The projection data consequently relates to the projection space or is acquired in the latter. Image data in the form of at least one two-dimensional sectional image or a volume dataset of the examination subject can be computed from the individual projections by way of a reconstruction algorithm.

An examination subject within the meaning of the invention is a patient, which in most cases is a human being. Basically, the patient may also be an animal. The two terms "examination subject" and "patient" are therefore used synonymously below.

A reconstruction algorithm within the meaning of the invention is to be understood as a per se known method for reconstructing image data from the projection data. In this respect, the image data relates to the image space or is present in the latter. A filtered back-projection method (FBP) is a standard image reconstruction technique. Following the projection data acquisition, a so-called "rebinning" step is initially performed in which the projection data generated by way of a beam spreading out from the source in the shape of a fan is reordered in such a way that it is present in a form as if the detector were struck by X-ray beams converging on it in parallel. The data is then transformed into the frequency domain. A filtering takes place in the frequency domain and the filtered data is subsequently back-transformed.

A back-projection onto the individual voxels within the volume of interest is then performed with the aid of the thus resorted and filtered data. However, the approximative approach of the FBP method causes low-frequency cone beam artifacts and helical artifacts. Furthermore, the image sharpness is coupled to the image noise. In comparison therewith, iterative reconstruction methods are preferred. With these, initial image data is first reconstructed from the projection data or projection measurement data.

A convolution back-projection method can be used for this purpose, for example. A "projector", i.e. a projection operator, which maps the measurement system mathematically as faithfully as possible, projects the initial image data in order to generate synthetic projection data. The difference compared to the original projection data is back-projected using the adjoint operator for the projector and then a residual image is reconstructed by which the initial image is updated. The updated image data can in turn be used in order to generate new synthetic projection data in a next iteration step with the aid of the projection operator, to form the difference compared to the measurement signals once again therefrom, and to calculate a new residual image with which the image data of the current iteration step is improved once again, etc.

By way of such a method it is possible to reconstruct image data exhibiting an improved image sharpness with low image noise. Examples of iterative reconstruction methods are the algebraic reconstruction technique (ART), the simultaneous algebraic reconstruction technique (SART), the iterative filtered back-projection technique (IFBP), or statistical iterative image reconstruction techniques besides. Preferred reconstruction methods which can be used in conjunction with the method according to the invention are e.g. the sinogram-based iterative reconstruction technique or also a model-based iterative reconstruction.

In an embodiment variant of the method, the image matrix size is calculated as a function of a minimum increment for the image matrix size. A minimum increment describes a pre-specified number of picture elements, in particular pixels, by which the image matrix size to be calculated can be increased or reduced. The minimum increment can preferably amount to 32, 64, 128, particularly preferably 256, picture elements. In other words, the image matrix size can advantageously be changed only incrementally. The smaller the chosen minimum increment, the better the image matrix size can take account of the respective parameters included in the calculation. However, the inventive introduction of a minimum increment simplifies the calculation step compared to a stepless image matrix size.

Particularly advantageously, the minimum increment can be individually adjusted by an operator prior to an X-ray examination.

In another embodiment variant of the method, the image matrix size is calculated taking into account at least one parameter of the reconstruction algorithm and/or its reconstruction kernel. Taking reconstruction parameters or the reconstruction kernel into account advantageously affects performance, in particular the speed or duration of a reconstruction process. Adjusting the image matrix size to fit parameters of the reconstruction that is to be performed can positively shorten the duration of an examination, both from the perspective of the operator and from the perspective of the patient.

A reconstruction kernel within the meaning of embodiments of the present invention corresponds to the convolution kernel employed in the reconstruction of the image data. The reconstruction kernel is in this case applied to the projection data. The reconstruction kernel may be smoothing or contrast-enhancing. The reconstruction kernel can be selected or adjusted in particular according to a type of examination, a medical issue underlying the examination and/or a body region that is to be examined. For example, contrast-enhancing reconstruction kernels specifically for the visualization of bone or lung tissue are known. The choice of the reconstruction kernel has a significant effect on the quality of the reconstructed image data. A reconstruction kernel suitable for tissue that is to be subject to diagnostic assessment can also advantageously reduce the necessary radiation dose without compromising on quality.

As already mentioned hereinabove, the reconstruction algorithm is preferably an iterative reconstruction algorithm.

A parameter of the reconstruction algorithm may be for example the number of forward- and back-projection loops or the number of artifact correction or noise minimization loops through which passes are made within the reconstruction. These parameters are typically geared to the body region under examination or the imaged organ or tissue, which may differ from one another significantly in terms of their interaction with X-ray radiation.

In another embodiment variant of the method, the image matrix size is calculated taking into account a minimum image quality that is to be achieved with the image data. The image quality in this case comprises not only a desired minimum spatial resolution that is to be guaranteed, but also specifications with regard to maximum tolerable image errors or artifacts, such as e.g. the image noise or metal artifacts that can be caused by metallic implants in the imaged body region.

In another embodiment variant of the method, the image matrix size is calculated taking into account a medical issue underlying the projection data acquisition and/or at least one parameter of the measurement protocol used for the projection data acquisition and/or a parameter representing the imaged body region or the tissue included therein. The medical issue is to be understood within the meaning of the invention as an initial clinical suspicion, as a referral job, or the like, from which the reason for the radiological examination of the examination subject is derived. In this embodiment, it is advantageously taken into account that a medical issue, a body region under examination and/or a measurement protocol used may require a particular image matrix size or may specify an upper or lower bound for the image matrix size.

In an embodiment variant of the method, the image matrix size is calculated taking into account an available storage capacity for the reconstructed image data. This embodiment of the invention allows for the fact that only a limited amount of storage space may be available for reconstructed image data. In other words, the sum total of the reconstructed image data associated with an examination may be greater than an available storage capacity, e.g. in a PACS system (Picture Archiving and Communication System) of a medical institution. In this case the image matrix size is adjusted from the outset to fit the maximum storable data volume.

In another embodiment of the method, the image matrix size is calculated according to the following rule $$N = \Delta N * \left[ 2 * a * \frac{F_{ax} * \rho_c}{\Delta N} \right],$$

where N—is the calculated image matrix size (in a spatial dimension),
ΔN—is the minimum increment,
$F_{ax}$—is the axial field of view,
$\rho_c$—is the sharpness value, and
a—is a free scaling factor.

As already mentioned in the introduction, the axial field of view is to be understood within the meaning of the invention as the coverage of the field of view of a computed tomography system that extends perpendicularly to its axis of rotation. As likewise mentioned in the introduction, the sharpness value is to be understood as the desired maximum spatial frequency (lp/mm) in the reconstructed image data.

In this embodiment, the product of axial field of view and sharpness value is placed in relation to the minimum increment. In a preferred embodiment variant, the free scaling factor a may be embodied as a proportionality constant which preferably assumes a value of a≈1. The bracket open at the bottom in the equation indicates that where appropriate the enclosed term is rounded up to the next whole number. However, the rounding operation is optional.

In another embodiment of the method, the image matrix size is calculated according to the rule $$N = \min\left(N_{max}, \max\left(N_{min}, \Delta N * \left\lceil 2 * \frac{F_{ax} * \rho_c * f}{\Delta N} + c \right\rceil\right)\right),$$

where N—is the calculated image matrix size,
ΔN—is the minimum increment,
$N_{max}$—is a maximum permitted image matrix size,
$N_{min}$—is a minimum permitted image matrix size,
$F_{ax}$—is the axial field of view,
$\rho_c$—is the sharpness value,
f—is a free scaling factor, and
c—is a free offset parameter.

In this embodiment variant, in addition to a maximum permitted image matrix size $N_{max}$, a minimum permitted image matrix size $N_{min}$ is also defined in advance. This can be dependent on the type of examination, the medical issue, the body region under examination or the examined tissue or organ, e.g. the heart, and/or the like, and correspond to that image matrix size that is required as a minimum for a reliable diagnostic assessment of the reconstructed image data. The free scaling factor f and the free offset parameter c may in each case preferably be determined e.g. empirically from an analysis of reconstruction parameters of a plurality of already completed reconstruction jobs. For this purpose, all available reconstruction jobs of a manufacturer's computed tomography systems installed in the field can be evaluated, for example.

By way of the free scaling factor f and the free offset parameter c, switchover points between adjacent image matrix sizes can be influenced in such a way that for example a balanced relationship between image quality and reconstruction performance, in particular reconstruction speed, is achieved. In this case, too, the bracket open at the bottom in the equation indicates that where appropriate the enclosed term is rounded up to the next whole number. The rounding operation is optional in this case also.

In this embodiment variant, the maximum from the group comprising the pre-specified minimum permitted image matrix size $N_{min}$ and the image matrix size resulting from the variables axial field of view, sharpness value, scaling factor, offset parameter, and minimum increment is first determined according to $$\Delta N * \left\lceil 2 * \frac{F_{ax} * \rho_c * f}{\Delta N} + c \right\rceil.$$

The determined maximum of this comparison is then compared with the maximum permitted image matrix size $N_{max}$ and the smaller of the two values is established. The value determined in this way corresponds to the calculated image matrix size.

In a further embodiment of the method, the sharpness value is calculated taking into account a functional of the modulation transfer function of the computed tomography system.

As already mentioned in the introduction, the modulation transfer function or contrast transfer function describes the ratio of image contrast to object contrast. It is specific to an imaging system, in this case the computed tomography system used. This ratio is dependent on the actual spatial frequency of the object. The higher the spatial frequency, the poorer is typically the ratio formed from image contrast and object contrast, i.e., the lower are image contrast and image sharpness.

Instead of an actual sharpness value which represents the modulation transfer function at one point only (that at which the modulation transfer function assumes the desired value, e.g. 10%), a general assignment in the form of a functional which takes the entire modulation transfer function into account can be used for the calculation of the image matrix size, e.g. in the form of $\rho_c$=F[MTF], where MTF stands for the modulation transfer function. In this embodiment variant, the entire spatial frequency response can advantageously be taken into account. Alternatively, only specific, selected spatial frequencies can be taken into account. In other words, a better consideration of the actual evolution of the modulation transfer function specific to the imaging system is achieved in this embodiment.

According to an example, an average value can be calculated from two frequencies in order to form the sharpness value, e.g. $\rho_c$=½*($\rho_{50}$+$\rho_{10}$), where $\rho_{50}$ and $\rho_{10}$ correspond in each case to the frequencies at which the modulation transfer function reaches the value 10% and 50%, respectively. Instead of two discrete values of the modulation transfer function, an arbitrarily large number of discrete values can be taken into account by way of the functional. At the same time it can be provided that all corresponding spatial frequencies are included with a weighting factor that can be the same or different for all frequency values. Finally, in a further preferred embodiment variant, the entire evolution of the modulation transfer function could be taken into account via the sharpness value so that the entire modulation transfer function is included in the calculation of the sharpness value.

To sum up, at least one embodiment of the present invention makes a sometimes difficult compromise between the different influencing variables unnecessary for the operator in the choice of an optimal image matrix size for an examination of an examination subject. The necessary storage capacity can nonetheless be limited to a minimum.

In another embodiment, the invention relates to a computing unit for calculating an image matrix size for the purpose of reconstructing image data of an examination subject from projection data, wherein the computing unit is embodied for acquiring projection data recorded during a relative rotational movement between a radiation source of a computed tomography system and the examination subject, and calculating the image matrix size in accordance with the steps of the method according to an embodiment of the invention.

In a preferred embodiment, the computing unit also comprises a reconstruction unit which is embodied to register the calculated image matrix size and use the same to reconstruct the image data from the projection data.

The computing unit is advantageously integrated into the computed tomography system. Alternatively, the computing unit may also be arranged at a distance or remotely. The computing unit can be embodied to perform the entire method according to the invention for the computed tomography system or for a plurality of installations, e.g. in a radiology center or hospital comprising a number of computed tomography systems.

In another embodiment, the invention relates to a computed tomography system for calculating an image matrix size for the purpose of reconstructing image data of an examination subject from projection data, comprising a computing unit according to of an embodiment of the invention, and a reconstruction unit for reconstructing image data having the calculated image matrix size from the projection data.

The computed tomography system may advantageously also comprise an acquisition unit for acquiring the projection data. The acquisition unit may be embodied as a (directly or indirectly converting) X-ray beam detector. The acquisition unit may include an interface to the computing unit, the projection data being transferred to the computing unit via said interface.

The reconstruction unit can advantageously be encompassed by the computing unit of the computed tomography system. Each of the units can be embodied in the form of individual or multiple components, i.e. processor or computer, which may furthermore be arranged as spatially cohesive, but also as spatially separate from one another. The computing unit and the reconstruction unit can particularly preferably be resident in the cloud.

The computed tomography system can advantageously also comprise a display device on which image data reconstructed for an observer can be displayed directly.

In another embodiment, the invention relates to a computer program which can be loaded directly into a memory unit of a computing unit according to an embodiment of the invention and has program sections for performing the steps of the method according to an embodiment of the invention when the computer program is executed in the computing unit.

In another embodiment, the invention relates to a computer-readable medium on which program sections that can be read in and executed by a computing unit according to an embodiment of the invention in order to perform all steps of the method according to an embodiment of the invention when the program sections are executed by the computing unit.

The embodiment of the invention in the form of a computer program or a computer-readable data medium comprising program code of an inventive computer program affords the advantage that existing computer systems or computing units can easily be adapted by way of a software update in order to realize a function according to an embodiment of the invention.

The computer program can alternatively be embodied in the form of a computer program product and comprise additional units. These can be embodied as hardware, e.g. as a storage medium on which the computer program is stored, and/or as a hardware key in order to enable the computer program to be used. Alternatively or in addition, they can be embodied as software, e.g. as a set of program documentation or as a software key in order to enable the computer program to be used.

FIG. 1 shows a schematic representation of the inventive method in an example embodiment. In a first step S1, projection data generated during the examination of a patient 3 via a computed tomography system is acquired. The data acquisition is performed for example via a computing unit 12 as described in more detail with reference to FIG. 4.

The projection data can be transferred for example directly by a scanning unit 17 comprising an X-ray detector 9 of the computed tomography system 1 to the computing unit 12 via connections that are known per se.

In a second step S2, the axial field of view of the computed tomography system 1 which was used or set at the time of the acquisition of the projection data is registered or determined. The registration or determination step is carried out by the computing unit 12 or via corresponding communication interfaces. This information can be input for example manually by a user via input unit 7 or else be retrieved or derived automatically. The extent of the axial field of view typically corresponds to the size of the imaged body region of the patient 3 in one spatial dimension. The extent of the axial field of view can be determined for example based on the planned type of examination and/or the individual patient anatomy and/or is set according to an existing initial suspicion prior to the projection data acquisition in the course of the acquisition protocol planning and stored together with the acquisition protocol. In this respect, the computing unit 12 within the meaning of the invention can also be engaged in data communication with a control or supervisory unit of the computed tomography system and register the extent of the axial field of view in relation to the acquired projection data.

In the second step S2, the sharpness value of the image data to be reconstructed is also registered. This value is a measure for the detail sharpness of imaged anatomical structures in the reconstructed image data that must be complied with at a minimum so that the reconstructed image data will permit a clinical assessment according to the medical issue or the initial suspicion. This required sharpness value can for example be specified in advance according to an acquisition protocol and stored as retrievable for the computing unit 12 from a memory 22 of the computing unit, e.g. in the form of a lookup table. Alternatively, the sharpness value can be calculated by the computing unit in one of the described embodiment variants as a functional of the modulation transfer function specific to the computed tomography system. A prerequisite for this is knowledge of the modulation transfer function of the computed tomography system.

Optionally, step S2 can also comprise registering or determining a minimum increment for the image matrix size that is to be calculated. The minimum increment can be input for example manually by a user via the input unit 7 or else be retrieved as a pre-specified variable from memory 22. The minimum increment defines a minimum increment by which the image matrix size can be varied. The minimum increment is in particular a multiple of the number 32, i.e. for example 64, 128, 256, 516, etc.

In step S2, it may optionally also be provided to evaluate the reconstruction algorithm applied by the reconstruction unit 23. This evaluation comprises determining the reconstruction kernel and/or further reconstruction parameters which have a significant influence in particular on the speed of the reconstruction algorithm or the image quality of the reconstructed image data. A larger image matrix size typically results in a longer reconstruction time. Taking into account the reconstruction kernel or at least one reconstruction parameter, a small image matrix size can advantageously be chosen while giving consideration to further influencing variables.

Optionally, step S2 may also comprise a registration or determination of a minimum image matrix size and/or a maximum image matrix size. The maximum image matrix size can be defined for example based on an available storage capacity and/or based on a reconstruction performance. A minimum image matrix size can be specified for example based on the sharpness value and/or the pixel size of the X-ray beam detector 9 used.

In a third step S3, the image matrix size is calculated as a function of the extent of the axial field of view as well as the required sharpness value.

The calculation of the image matrix size comprises forming the product of extent of the axial field of view and the required sharpness value.

In an example embodiment, the calculation can be performed as per equation (1) according to $$N = \Delta N * \left\lceil 2 * a * \frac{F_{ax} * \rho_c}{\Delta N} \right\rceil.$$

The proportionality constant a preferably assumes a value in the range of 1, e.g. it can lie between 0.5 and 1.5, where a=0.8 is particularly preferred. The proportionality constant can preferably be determined empirically. In another example embodiment, the calculation can be performed as per equation (2) according to $$N = \min\left\{N_{max}, \max\left(N_{min}, \Delta N * \left\lceil 2 * \frac{F_{ax} * \rho_c * f}{\Delta N} + c \right\rceil\right)\right\}.$$

The free scaling factor f substantially corresponds to the proportionality constant a of the alternative calculation rule according to equation (1) and moves in a corresponding value range. The free offset parameter c can be used to adjust the switchover point between two adjacent values for the image matrix size according to the currently applicable minimum increment. Alternatively, as also in the alternative calculation rule, the free offset parameter c can be set to zero.

Influencing variables such as reconstruction kernel, reconstruction parameters, the type of examination, e.g. a multi-image acquisition with a plurality of individual image acquisitions closely succeeding one another in time, which must be available directly after the reconstruction without significant time delay for a visualization e.g. on the display unit 11, the imaged body region, the imaged organ or the like can be taken into account individually or in combination via the proportionality constant a, the free scaling factor f and the free offset parameter c. The cited variables can be derived in particular from a database or lookup table that may be stored in memory 22. The database can comprise a plurality of radiological examinations and the associated reconstruction jobs comprising the image matrix size used in each case. The plurality of the data may be based in particular on real examinations carried out on patients. The plurality of the data may be sub-classified according to the imaged body region or at least one organ or tissue included therein, e.g. one data class may comprise examinations relating to the abdomen, another data class e.g. examinations relating to the head, or yet another data class examinations relating to the heart.

The proportionality constant a, the free scaling factor f and/or the free offset parameter c are therefore preferably derived empirically on the basis of the available or retrievable influencing variables.

Figure 2:
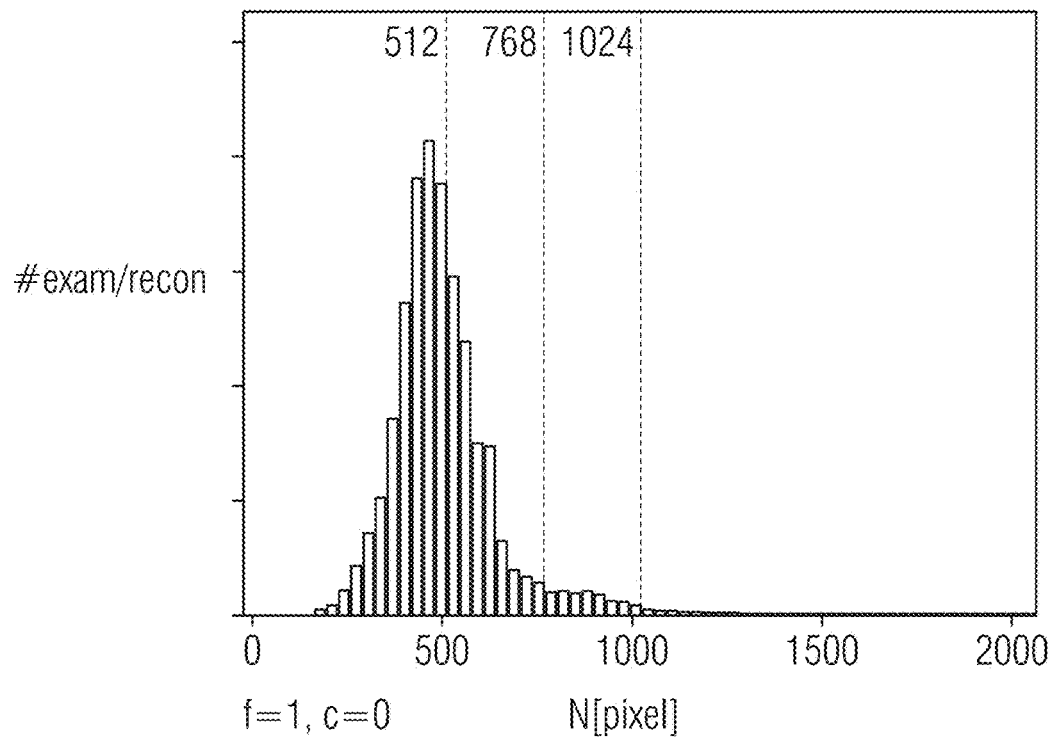
FIG. 2 shows a histogram plot of a plurality of examinations corresponding to the associated image matrix size for the organ characteristic 'abdomen'.
Figure 3:
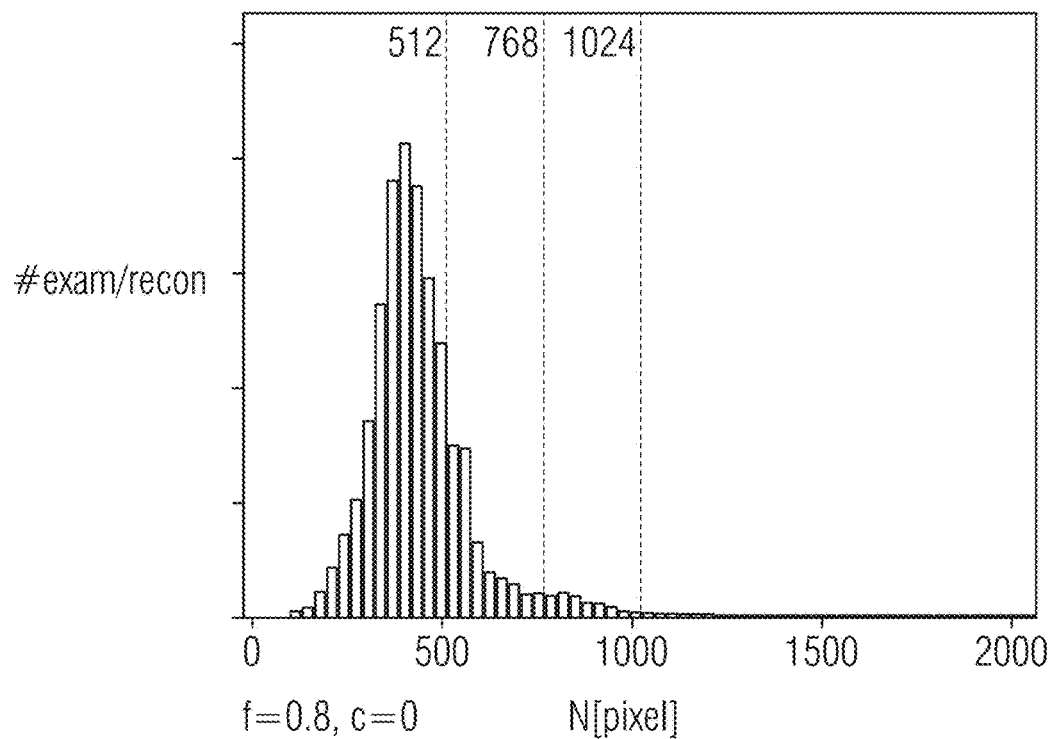
FIG. 3 shows a further histogram plot of a plurality of examinations corresponding to the associated image matrix size for the organ characteristic 'abdomen'.

By way of example, FIGS. 2 and 3 each show a schematic histogram analysis of the computationally resulting image matrix size of the image data to be reconstructed for the organ characteristic "abdomen", in this case with a bin width of 32 pixels for the calculation method according to equation (2). The histograms plot the frequency of the radiological examinations and reconstruction processes associated therewith over the image matrix size resulting from the above-listed influencing variables. In this example, the image matrix size of the reconstruction job can assume the discrete values 512, 768 or 1024. In other words, the minimum image matrix size in this case lies at 512, the maximum image matrix size at 1024, the minimum increment amounting to 256. The switchover points can be influenced by the free parameters f and c such that a balanced relationship is achieved between image quality and reconstruction performance. FIG. 2 and FIG. 3 differ from each other by the values of the free parameter f and the displacement of the histogram curve caused thereby. This leads in FIG. 3 to an increased number of reconstruction jobs having the image matrix size 512.

The histograms shown in FIGS. 2 and 3 permit no inferences to be made in relation to histograms with a different organ characteristic.

In a further step S4, the thus calculated image matrix size is provided for the reconstruction process. In particular, it can be provided that the data processing unit 16 communicates the image matrix size to the reconstruction unit 23.

The reconstruction of the image data can then be performed using the calculated image matrix size.

Figure 4:
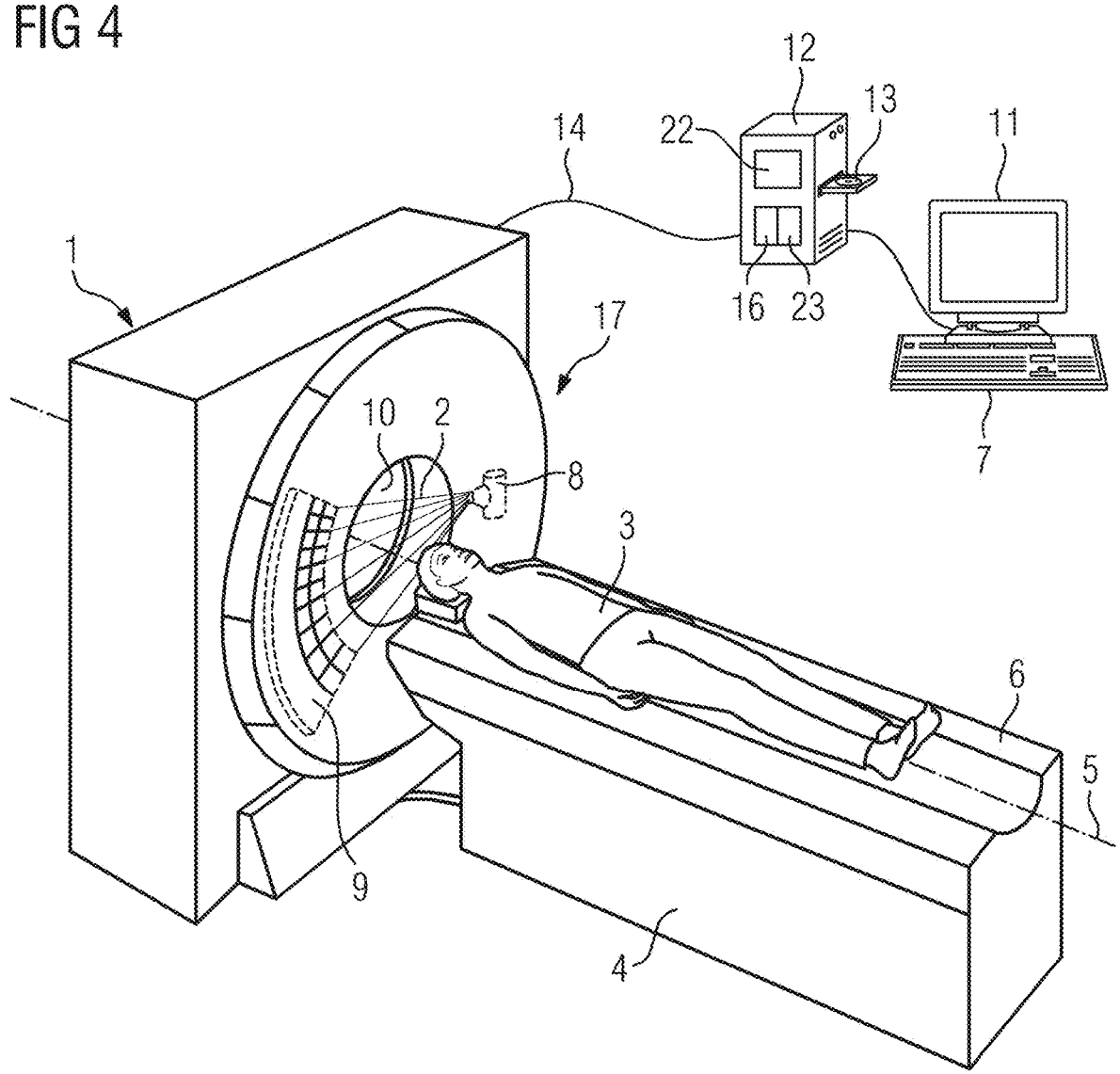
FIG. 4 shows a medical imaging system in the form of a computed tomography system comprising an inventive computing unit according to another example embodiment of the invention.

FIG. 4 shows a medical imaging system 1 in the form of a computed tomography system 1. The computed tomography system 1 shown here possesses a scanning unit 17, comprising an X-ray radiation source 8 and an X-ray radiation detector or X-ray detector 9. The X-ray detector 9 may be embodied as a direct-converting or indirect-converting X-ray detector 9. During the acquisition of projection data or X-ray projections, the scanning unit 17 rotates around a system axis 5, the axis of rotation of the computed tomography system 1, and during the acquisition the X-ray source 8 emits X-ray beams 2; the latter pass through at least a subregion of the body of the patient 3 and in the process are attenuated and impinge on the X-ray detector 9.

During the acquisition of the projection data, the patient 3 lies on a patient couch 6. The patient couch 6 is connected to a couch base 4 such that the latter supports the patient couch 6 together with the patient 3. The patient couch 6 is configured to move the patient 3 along a scanning direction through the bore 10 of the scanning unit 17. The scanning direction is generally given by the system axis 5, about which the scanning unit 17 rotates when acquiring projection data. In this example, the body axis of the patient 3 is the same as the system axis 5. In a helical scan, the patient couch 6 is moved continuously through the bore 10 while the scanning unit 17 rotates around the patient 3 and records projection data. The X-ray beams 2 accordingly describe a spiral on the surface of the patient 3. The patient 3 can but does not have to be moved during the examination.

The computed tomography system 1 possesses a computing unit 12 in the form of a computer which is connected to a display unit 11, for example for graphically displaying reconstructed image data having the previously calculated image matrix size, e.g. in the form of medical images, in this case in particular in the form of computed tomography images or a control menu for the computed tomography system 1, as well as to an input unit 7. The display unit 11 can be for example an LCD, plasma or OLED screen. It may furthermore be a touch-sensitive screen which is also embodied as an input unit 7. Such a touch-sensitive screen may be integrated into the imaging device or be embodied as part of a mobile device. The input unit 7 is for example a keyboard, a mouse, a touchscreen, or a microphone for voice input. The input unit 7 can be set up to detect movements of a user and translate these into corresponding commands. Via input unit 7, in particular by voice or keyboard, a user can for example input information relating to a medical issue, an initial suspicion relating to a patient 3 or the like. A user could also input a maximum or minimum permitted image matrix size $N_{max}$, $N_{min}$ or a minimum increment $\Delta N$ via the input unit 7.

The computing unit 12 is connected to the rotatable scanning unit 17 for data exchange purposes. On the one hand, control signals for the data acquisition or image data acquisition can be transmitted from the computer 12 to the scanning unit 17 via the connection 14. On the other hand, projection data acquired for the patient 3 can be transferred to the computer 12 for an image reconstruction by way of established reconstruction methods. The connection 14 is realized in the known manner as wired or wireless. In addition, information relating to a medical issue, an acquisition protocol used, the body region of the patient to be examined or the like can be transmitted to the computing unit via the connection 14. Alternatively, the information can be supplied to the computing unit 12 in a per se known manner in particular automatically or provided on demand via a mobile, per se known computer-readable data medium, via a PACS, via a hospital or radiology information system (HIS or RIS), or via the internet, e.g. from a cloud memory.

The computing unit 12 in the form of the computer according to this example embodiment comprises a data processing unit 16. It is configured in particular to perform all computational steps in relation to the inventive method for the purpose of determining an image matrix size, as already described initially with reference to FIG. 1.

In this example embodiment, the computing unit 12 also comprises a reconstruction unit 23 for reconstructing image data from projection data on the basis of the calculated image matrix size.

Both units 16 and 23 may be realized as separate processing units, but may also be embodied jointly in one unit. In the first case, the units 16 and 23 are connected at least via a data link in order to transfer the image matrix size calculated by the unit 16 to the reconstruction unit 23 for further processing.

The computing unit 12 can communicate in particular with the cited components or units via the DICOM standard interchange protocol, though other communication protocols or standards and data formats are likewise conceivable.

The computing unit 12 can cooperatively interact with a computer-readable data medium 13, in particular in order to perform a method according to an embodiment of the invention by way of a computer program comprising program code. Furthermore, the computer program can be stored in downloadable form on the machine-readable data medium. In particular, the machine-readable medium can be a CD, DVD, Blu-ray disc, a memory stick or a hard disk. The computing unit 12, and consequently also its subcomponents, can be embodied in the form of hardware or in the form of software. For example, the computing unit 12 is embodied as a device known as an FPGA (acronym for "Field Programmable Gate Array") or comprises an arithmetic logic unit. Alternatively, the computing unit 12 and individual or all of its subcomponents can be arranged non-centrally, e.g. individual computational steps of the method can be performed in a central data center of a medical services institution, e.g. a hospital, or in the cloud. In this case it is important in particular to be mindful of data and patient protection during the exchange of data. The computing unit 12 can be embodied as a component of the computed tomography system 1 or as a cloud-based computer.

In the embodiment variant shown here, at least one computer program is stored in a memory 22 of the computing unit 12 in order to perform all method steps of the method according to an embodiment of the invention when the computer program is executed on the computer 12. The computer program for performing the method steps of the inventive method comprises program code. Furthermore, the computer program can be embodied as an executable file and/or be stored on a different computing system from the computer 12. For example, the computed tomography system 1 can be configured such that the computer 12 loads the computer program for performing the inventive method into its internal working memory via an intranet or via the internet.

Where not yet explicitly realized, though beneficial and within the meaning of the invention, individual example embodiments and individual subordinate aspects or features thereof may be combined or interchanged with one another without leaving the scope of the present invention. Advantages of the invention that are described with reference to one example embodiment are also relevant, where applicable, to other example embodiments without being cited explicitly.

The patent claims of the application are formulation proposals without prejudice for obtaining more extensive patent protection. The applicant reserves the right to claim even further combinations of features previously disclosed only in the description and/or drawings.

References back that are used in dependent claims indicate the further embodiment of the subject matter of the main claim by way of the features of the respective dependent claim; they should not be understood as dispensing with obtaining independent protection of the subject matter for the combinations of features in the referred-back dependent claims. Furthermore, with regard to interpreting the claims, where a feature is concretized in more specific detail in a subordinate claim, it should be assumed that such a restriction is not present in the respective preceding claims.

Since the subject matter of the dependent claims in relation to the prior art on the priority date may form separate and independent inventions, the applicant reserves the right to make them the subject matter of independent claims or divisional declarations. They may furthermore also contain independent inventions which have a configuration that is independent of the subject matters of the preceding dependent claims.

None of the elements recited in the claims are intended to be a means-plus-function element within the meaning of 35 U.S.C. § 112(f) unless an element is expressly recited using the phrase "means for" or, in the case of a method claim, using the phrases "operation for" or "step for."

Example embodiments being thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A method for calculating an image matrix size N for reconstructing image data of an examination subject from projection data, the method comprising:

acquiring projection data obtained during a relative rotational movement between a radiation source of a computed tomography system and the examination subject;

calculating the image matrix size N as a function of an extent of an axial field of view of the computed tomography system and a sharpness value in the image data to be reconstructed; and making the calculated image matrix size available to a reconstruction unit to reconstruct the image data from the projection data acquired, wherein the image matrix size N is calculated during the calculating, taking into account an available storage capacity.

2. The method of claim 1, wherein the image matrix size N is calculated as a function of a minimum increment ΔN for the image matrix size.

3. The method of claim 1, wherein the image matrix size N is calculated taking into account at least one of
at least one parameter of a reconstruction algorithm and
a reconstruction kernel of the reconstruction algorithm.

4. The method of claim 1, wherein the image matrix size N is calculated taking into account a minimum image quality to be achieved.

5. The method of claim 1, wherein the image matrix size N is calculated taking into account at least one of
a medical issue underlying projection data acquisition,
at least one parameter of a measurement protocol used for the projection data acquisition and
a parameter representing an imaged body region.

6. The method of claim 1, wherein the image matrix size N is calculated according to $$N = \Delta N * \left\lceil 2 * a * \frac{F_{ax} * \rho_c}{\Delta N} \right\rceil,$$

wherein N—is the image matrix size calculated,
ΔN—is a minimum increment for the image matrix size,
$F_{ax}$—is the axial field of view,
$\rho_c$—is the sharpness value, and
a—is a proportionality constant.

7. The method of claim 1, wherein the image matrix size is calculated according to $$N = \min\left\{N_{max}, \max\left(N_{min}, \Delta N * \left\lceil 2 * \frac{F_{ax} * \rho_c * f}{\Delta N} + c \right\rceil\right)\right\},$$

where N—is the image matrix size calculated,
ΔN—is a minimum increment for the image matrix size,
$N_{max}$ is a maximum permitted image matrix size,
$N_{min}$—is a minimum permitted image matrix size,
$F_{ax}$—is the axial field of view,
$\rho_c$—is the sharpness value,
f—is a free scaling factor, and
c—is a free offset parameter.

8. The method of claim 1, wherein the sharpness value is calculated taking into account a functional of a modulation transfer function of the computed tomography system.

9. A device to calculate an image matrix size N for reconstructing image data of an examination subject from projection data, the device comprising:
at least one processor embodied to
acquire projection data, recorded during a relative rotational movement between a radiation source of a computed tomography system and the examination subject; and
calculate the image matrix size N as a function of an extent of an axial field of view of the computed tomography system and a sharpness value in the image data to be reconstructed, wherein the image matrix size N is calculated, taking into account an available storage capacity.

10. The device of claim 9, further comprising:
at least one additional processor embodied to register the image matrix size N calculated and to use the image matrix size N calculated to reconstruct the image data from the projection data.

11. A computed tomography system for calculating an image matrix size N for reconstructing image data of an examination subject from projection data, comprising:
a device, including at least one processor, embodied to
acquire projection data recorded during a relative rotational movement between a radiation source of a computed tomography system and the examination subject, and
calculate the image matrix size N as a function of an extent of an axial field of view of the computed tomography system and a sharpness value in the image data to be reconstructed; and
at least one additional processor, embodied to reconstruct image data having the calculated image matrix size N from the projection data, wherein the image matrix size N is calculated, taking into account an available storage capacity.

12. A non-transitory computer program, directly loadable into a memory of a computing unit and including program sections for performing the method of claim 1 when the computer program is executed in the computing unit.

13. A non-transitory computer-readable medium, storing program sections readable into and executable by a computing unit, to perform the method of claim 1 when the program sections are executed by the computing unit.

14. The method of claim 2, wherein the image matrix size N is calculated taking into account at least one of
at least one parameter of the reconstruction algorithm and
a reconstruction kernel of the reconstruction algorithm.

15. The method of claim 2, wherein the image matrix size N is calculated according to $$N = \Delta N * \left\lceil 2 * a * \frac{F_{ax} * \rho_c}{\Delta N} \right\rceil,$$

wherein N—is the image matrix size calculated,
ΔN—is the minimum increment for the image matrix size,
$F_{ax}$—is the axial field of view,
$\rho_c$—is the sharpness value, and
a—is a proportionality constant.

16. The method of claim 2, wherein the image matrix size is calculated according to $$N = \min\left\{N_{max}, \max\left(N_{min}, \Delta N * \left\lceil 2 * \frac{F_{ax} * \rho_c * f}{\Delta N} + c \right\rceil\right)\right\},$$

where N—is the image matrix size calculated,

ΔN—is the minimum increment for the image matrix size,
$N_{max}$—is a maximum permitted image matrix size,
$N_{min}$—is a minimum permitted image matrix size,
$F_{ax}$—is the axial field of view,
$\rho_c$—is the sharpness value,
f—is a free scaling factor, and
c—is a free offset parameter.

\* \* \* \* \*